US012749421B2

(12) United States Patent
Lee et al.

(10) Patent No.: US 12,749,421 B2
(45) Date of Patent: Sep. 29, 2026

(54) DRIVER DEVICE AND METHOD FOR DRIVING DISPLAY PANEL

(71) Applicant: Novatek Microelectronics Corp., Hsinchu (TW)

(72) Inventors: Tsung-Chan Lee, Hsinchu City (TW); Jun-Yu Yang, Hsinchu City (TW); Feng-Ting Pai, Hsinchu City (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/798,860

(22) Filed: Aug. 9, 2024

(65) Prior Publication Data

US 2026/0045194 A1 Feb. 12, 2026

(51) Int. Cl.
*G09G 3/20* (2006.01)

(52) U.S. Cl.
CPC ... *G09G 3/2003* (2013.01); *G09G 2300/0842* (2013.01); *G09G 2310/0275* (2013.01); *G09G 2330/023* (2013.01); *G09G 2340/0457* (2013.01)

(58) Field of Classification Search
None
See application file for complete search history.

(56) References Cited

U.S. PATENT DOCUMENTS 10,872,552 B2 12/2020 Minaki et al.
11,164,502 B2 * 11/2021 Zhu ..................... G09G 3/3233
2010/0118045 A1 * 5/2010 Brown Elliott ...... H04N 13/302 345/589
2014/0218388 A1 * 8/2014 Higgins ................. G09G 5/024 345/592
2014/0232735 A1 8/2014 Jeong et al.
2017/0091903 A1 * 3/2017 Jo ........................... G06T 3/403
2019/0156727 A1 5/2019 Minaki et al.
2020/0273395 A1 8/2020 Furihata et al.
2021/0065625 A1 * 3/2021 Wang .................. G09G 3/3233
(Continued)

FOREIGN PATENT DOCUMENTS

CN 109817173 5/2019
CN 118447792 8/2024

OTHER PUBLICATIONS

"Office Action of Taiwan Counterpart Application", issued on Jun. 3, 2025, p. 1-p. 7.

*Primary Examiner* — Kenneth Bukowski
(74) *Attorney, Agent, or Firm* — JCIPRNET

(57) ABSTRACT

A driver device configured to drive a display panel to display images is provided. The driver device includes a storage circuit, a processor circuit, and a source driving circuit. The storage circuit stores image processing parameters. The processor circuit receives an input frame data and a selecting signal indicating a first subpixel rendering (SPR) format that the input frame data is in. The processor circuit processes the input frame data according to a part of the image processing parameters which is selected according to the selecting signal, to generate the output frame data. The source driving circuit receives a first frame data in a subpixel arrangement format from the processor circuit, and generates data voltages according to the first frame data to drive subpixels of the display panel. The subpixels of the display panel are arranged in the subpixel arrangement format.

22 Claims, 13 Drawing Sheets

(56) References Cited

U.S. PATENT DOCUMENTS

| | | | | |
|---|---|---|---|---|
| 2022/0051641 | A1* | 2/2022 | Park | G09G 5/10 |
| 2022/0114942 | A1* | 4/2022 | Orio | G09G 3/3291 |
| 2023/0100358 | A1 | 3/2023 | Minaki et al. | |
| 2023/0141954 | A1* | 5/2023 | Chang | G09G 3/30<br>345/694 |

* cited by examiner

DRIVER DEVICE AND METHOD FOR DRIVING DISPLAY PANEL

BACKGROUND

Technical Field

The invention relates to a driver device and a method for driving a display panel.

Description of Related Art

Image processing techniques are based on true color images in related arts. Consequently, sub-pixel rendered (SPR) images are required to be converted to true color images, and then converted to SPR images after image processing. The conversion of true color images to SPR images is irreversible, and the conversion of SPR images back to true color images will result in distortion and blurring. In addition, the conversion to true color image increases the amount of data, necessitating additional data storage space, and increases the amount and power consumption of computation.

SUMMARY

The invention is directed to a driver device and a method for driving a display panel, capable of processing an input frame data directly without converting the input frame data to the true color format.

An embodiment of the invention provides a driver device, configured to drive a display panel to display images. The driver device includes a storage circuit, a processor circuit, and a source driving circuit. The storage circuit is configured to store image processing parameters. The processor circuit is coupled to the storage circuit. The processor circuit is configured to receive an input frame data and a selecting signal indicating a first subpixel rendering (SPR) format that the input frame data is in. The processor circuit is configured to process the input frame data according to a part of the image processing parameters which is selected according to the selecting signal, to generate the output frame data. The source driving circuit is coupled to the processor circuit. The source driving circuit is configured to receive a first frame data in a subpixel arrangement format from the processor circuit; and generate data voltages according to the first frame data to drive subpixels of the display panel. The subpixels of the display panel are arranged in the subpixel arrangement format.

An embodiment of the invention provides a method for driving a display panel. The method includes: selecting a part of image processing parameters according to a selecting signal, wherein the selecting signal indicates a first subpixel rendering (SPR) format that an input frame data is in; processing the input frame data according to the part of the image processing parameters to generate an output frame data, wherein the output frame data is in a subpixel arrangement format; and generating data voltages according to a first frame data corresponding to the output frame data to drive subpixels of the display panel, wherein the subpixels of the display panel are arranged in the subpixel arrangement format.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Embodiments are provided below to describe the disclosure in detail, though the disclosure is not limited to the provided embodiments, and the provided embodiments can be suitably combined. The term "coupling/coupled" or "connecting/connected" used in this specification (including claims) of the application may refer to any direct or indirect connection means. For example, "a first device is coupled to a second device" should be interpreted as "the first device is directly connected to the second device" or "the first device is indirectly connected to the second device through other devices or connection means." In addition, the term "signal" can refer to a current, a voltage, a charge, a temperature, data, electromagnetic wave or any one or multiple signals.

Figure 1:
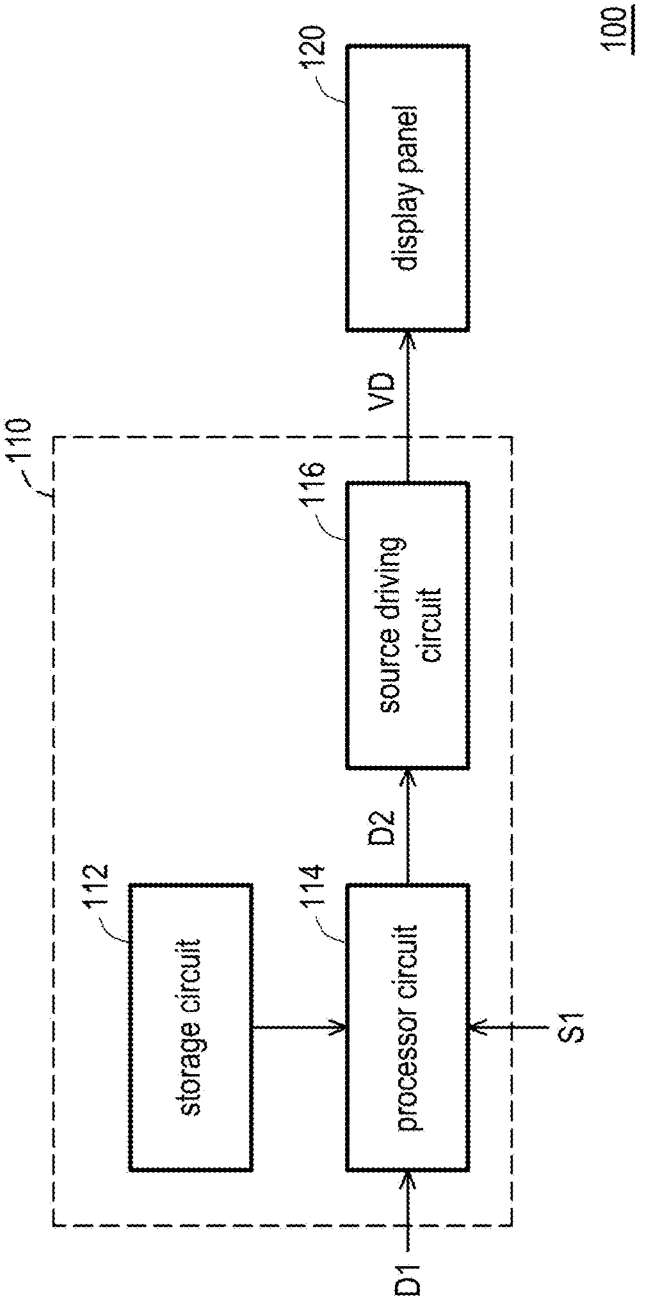
FIG. 1 is a block diagram illustrating a display device according to an embodiment of the invention.

FIG. 1 is a block diagram illustrating a display device according to an embodiment of the invention. Referring to FIG. 1, the display device 100 includes a driver device 110 and a display panel 120. The driver device 110 is coupled to the display panel 120. The driver device is configured to drive the display panel 120 to display images.

The driver device 110 includes a storage circuit 112, a processor circuit 114, and a source driving circuit 116. The processor circuit 114 is coupled to the storage circuit 112. The source driving circuit 116 is coupled to the processor circuit 114.

The storage circuit 112 is configured to store image processing parameters. The image processing parameters, for example, include parameters for processing image filtering, image resolution, image brightness, image spectral distribution, image discrepancy, image relevancy, image color depth, image refresh rate, and/or display modes of images, but the invention is not limited thereto. In addition, the image processing parameters may also include parameters adapted for a SPR format conversion. For image resolution, the scaling operation is an image processing technique used to increase or decrease the resolution of an image. When the input image is different from the display resolution, the scaling operation is used to adjust the image to match the display resolution. Therefore, the storage circuit 112 may store parameters of the scaling operation. In addition, the storage circuit 112 may also store parameters for image filtering.

The processor circuit 114 is configured to receive an input frame data D1 and a selecting signal S1. The selecting signal S1 indicates a first SPR format that the input frame data D1 is in. The processor circuit 114 is further configured to process the input frame data D1 according to a part of the image processing parameters to generate the output frame data D2. The output frame data D2 may be in the same first SPR format or a second SPR format different from the first SPR format. The part of the image processing parameters is selected according to the selecting signal S1.

The source driving circuit 116 is configured to receive the output frame data D2 (first frame data) in a subpixel arrangement format from the processor circuit 114. The source driving circuit 116 is further configured to generate data voltages VD according to the output frame data D2 to drive subpixels of the display panel 120. In the present embodiment, the subpixels of the display panel 120 are arranged in the subpixel arrangement format.

In an embodiment, the display panel 120 is of a medium or small size. The processor circuit 114 and the source driving circuit 116 are integrated into a single chip, whereby it is capable of performing either image processing or display driving functions.

The display panel 120 has either subpixel rendering (SPR) arrangement or true color arrangement. Each pixel of the true color panel includes three subpixels of red, green and blue. Each pixel of the SPR panel includes any two subpixels of red, green and blue. The arrangement of the display panel 120 is not intended to limit the invention.

In the present embodiment, a host outputs the input frame data D1 in the first SPR format to the processor circuit 114. The objective of outputting SPR frame data is to reduce the volume of transmitted data. The embodiments of the invention focus on receiving the input frame data D1 in the first SPR format from the host and processing the input frame data D1 directly without converting the input frame data D1 to the true color format. That is to say, the processor circuit 114 does not perform an inverse SPR format conversion on the input frame data D1 before processing the input frame data D1 according to the selected image processing parameters. The inverse SPR format conversion is an operation that converts the frame data from the SPR format to the true color format.

Regarding hardware structures of the components in the embodiment of FIG. 1, the processor circuit 114 may include a processor having computational capability. Alternatively, the processor circuit 114 may be designed through hardware description languages (HDL) or any other design methods for digital circuits familiar to people skilled in the art and may be hardware circuits implemented through a field programmable gate array (FPGA), a complex programmable logic device (CPLD), or an application-specific integrated circuit (ASIC). In addition, the implementation for the structures of the storage circuit 112, the processor circuit 114, the source driving circuit 116 and the display panel 120 can be obtained, taught and suggested with reference to common knowledge of the related art.

Figure 2:
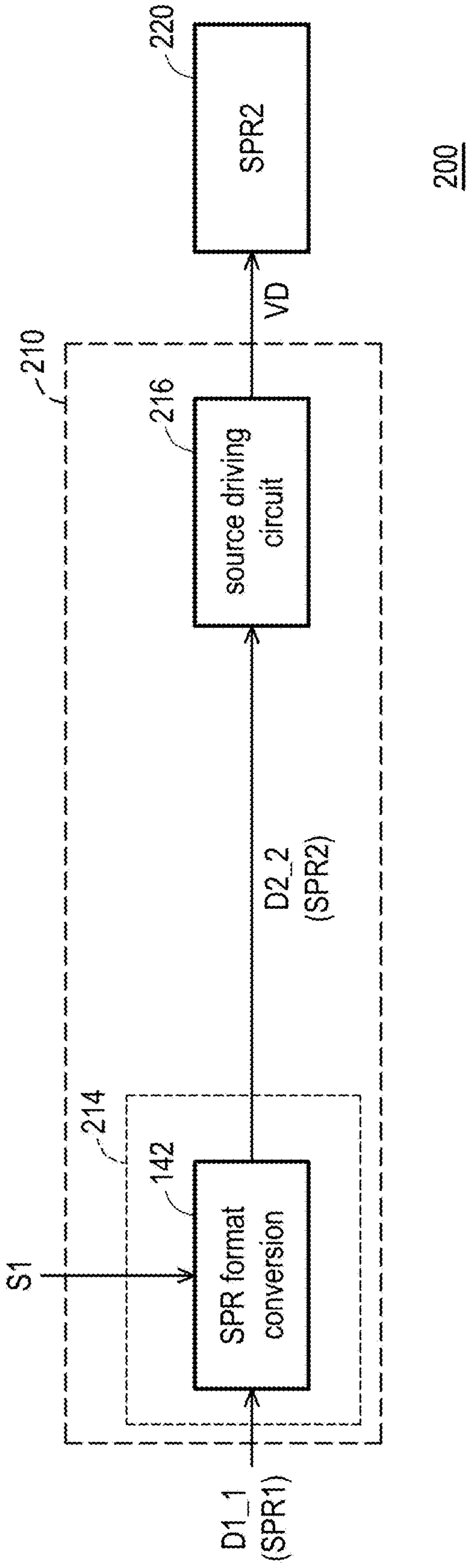
FIG. 2 is a block diagram illustrating a display device according to another embodiment of the invention.
Figure 3:
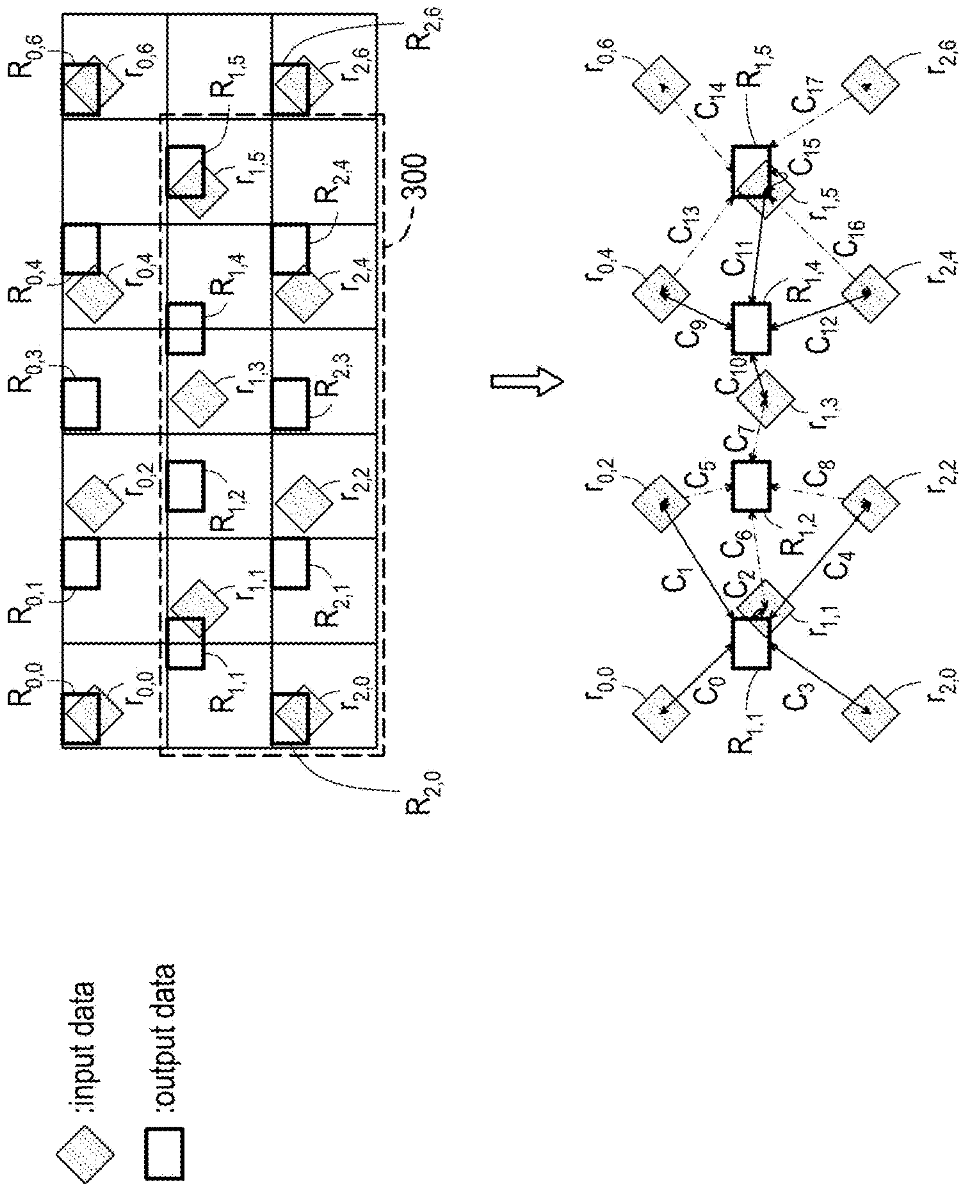
FIG. 3 is a schematic diagram illustrating a SPR format conversion according to an embodiment of the invention.

FIG. 2 is a block diagram illustrating a display device according to another embodiment of the invention. FIG. 3 is a schematic diagram illustrating a SPR format conversion according to an embodiment of the invention. Referring to FIG. 2 and FIG. 3, the processor circuit 214 processes the input frame data D1_1 in the first SPR format SPR1 to generate the output frame data D2_2, taken as the first frame data, in a second SPR format SPR2. The second SPR format SPR2 is different from the first SPR format SPR1. The output frame data D2_2 in the second SPR format SPR2 is configured to drive the display panel 220, which has a second SPR arrangement format SPR2.

The processor circuit 214 includes a first circuit block 142 to process the input frame data D1_1 according to the selected image processing parameters adapted for the SPR format conversion. The first circuit block 142 performs the SPR format conversion on the input frame data D1_1, and thus the input frame data D1_1 is converted to the output frame data D2_2. In the present embodiment, the processor circuit 214 does not perform the inverse SPR format conversion on the input frame data D1_1 before the SPR format conversion. The selected image processing parameters adapted for the SPR format conversion is selected from a storage circuit according to the selecting signal S1. For conciseness, the storage circuit is not shown in FIG. 2.

The selected image processing parameters adapted for the SPR format conversion are configured to generate a plurality of output pixel data of the output frame data D2_2. The plurality of output pixel data is corresponding to a repeating pixel arrangement unit 300 in FIG. 3. The repeating pixel arrangement unit 300 includes m by n pixels of the display panel 220, wherein m and n are positive integers. According to the repeating pixel arrangement unit 300 in FIGS. 3, m=2 and n=6, but the invention is not limited thereto.

To be specific, taking red input data $r_{i,j}$ and red output data $R_{i,j}$ for example, FIG. 3 shows the SPR format conversion of red channels. A distance and weight model is define for the red input data $r_{i,j}$ and the red output data $R_{i,j}$. The distance and weight model allows for the calculation of a set of weights for a specified subpixel and its neighboring subpixels. The set of weights can then be used to determine the red output data $R_{i,j}$ in weighted formulas. For example, the red output data $R_{1,1}$, $R_{1,2}$, $R_{1,4}$, $R_{1,5}$, are calculated in the following weighted formulas:

$$R_{1,1} = c_0 \cdot r_{0,0} + c_1 \cdot r_{0,2} + c_2 \cdot r_{1,1} + c_3 \cdot r_{2,0} + c_4 \cdot r_{2,2}$$

$$R_{1,2} = c_5 \cdot r_{0,2} + c_6 \cdot r_{1,1} + c_7 \cdot r_{1,3} + c_8 \cdot r_{2,2}$$

$$R_{1,4} = c_9 \cdot r_{0,4} + c_{10} \cdot r_{1,3} + c_{11} \cdot r_{1,5} + c_{12} \cdot r_{2,4}$$

$$R_{1,5} = c_{13} \cdot r_{0,4} + c_{14} \cdot r_{0,6} + c_{15} \cdot r_{1,5} + c_{16} \cdot r_{2,4} + c_{17} \cdot r_{2,6}$$

where $c_0$~$c_{17}$ are weight values, and $r_{0,0}$~$r_{2,6}$ are input data of the neighboring subpixels. The red output data $R_{2,0}$, $R_{2,1}$, $R_{2,3}$, $R_{2,4}$, $R_{2,6}$, can be calculated in the similar manner. Generally speaking, the closer the red output data $R_{i,j}$ is to the red input data $r_{i,j}$, the larger the weight values. Taking the red output data $R_{1,1}$ as an example, it is the closest to r the red input data $r_{1,1}$ and the farthest to the red input data $r_{2,2}$, so the weight value $c_2$ is larger than the weight value $c_4$. The number of neighboring subpixels for the weight calculation is not limited to 4 or 5, and can be increased freely and given appropriate weight values by adjusting the distance and weight model.

In the present embodiment, given that the arrangement of subpixels is periodic, once the red output data Ri,j of the repeating pixel arrangement unit 300 has been obtained, the remaining subpixels can be obtained by referencing the repeating pixel arrangement unit 300. In addition, the SPR format conversion of green and blue channels can be perform in the similar manner.

Figure 4:
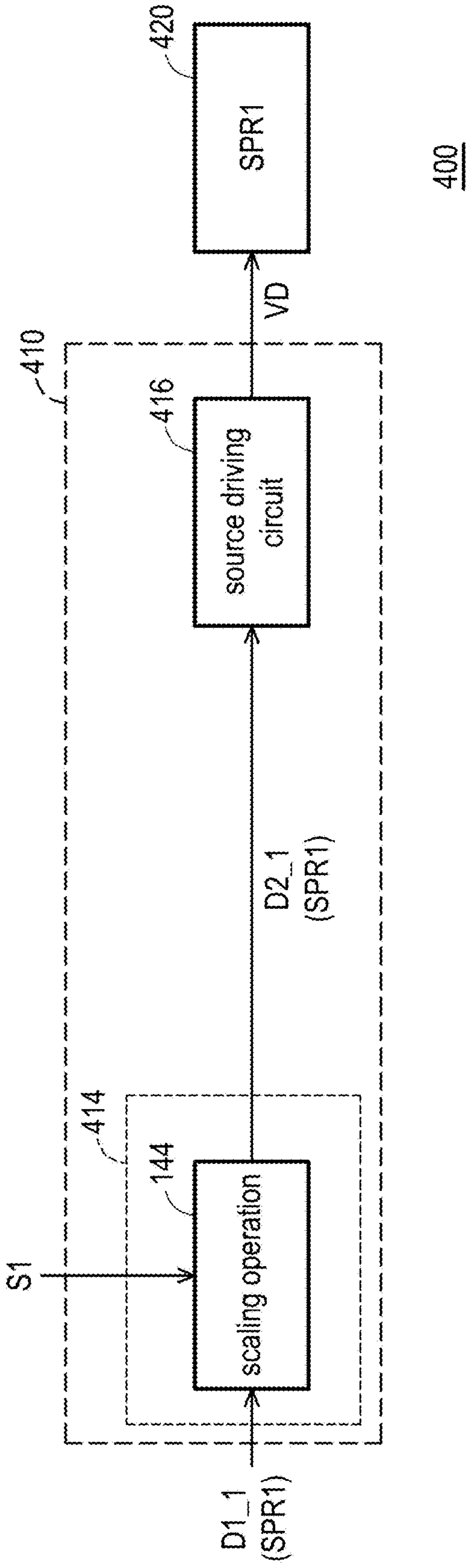
FIG. 4 is a block diagram illustrating a display device according to another embodiment of the invention.
Figure 5:
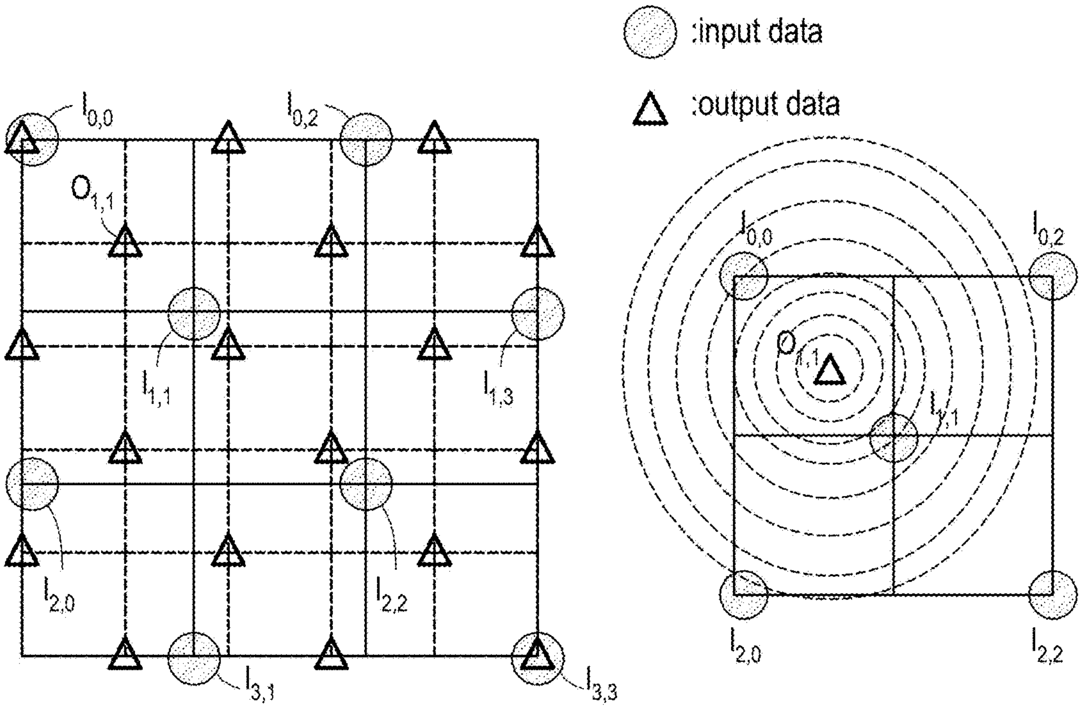
FIG. 5 is a schematic diagram illustrating a scaling operation according to an embodiment of the invention.
Figure 6:
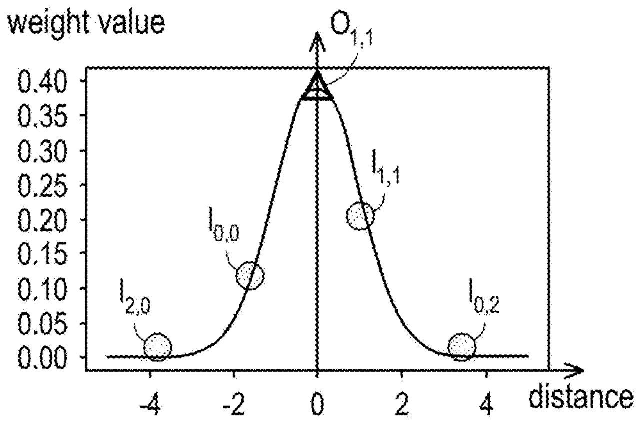
FIG. 6 is a schematic diagram illustrating a distribution of a distance and weight model according to an embodiment of the invention.

FIG. 4 is a block diagram illustrating a display device according to another embodiment of the invention. FIG. 5 is a schematic diagram illustrating a scaling operation according to an embodiment of the invention. FIG. 6 is a schematic diagram illustrating a distribution of a distance and weight model according to an embodiment of the invention. Referring to FIG. 4 to FIG. 6, the processor circuit 414 processes the input frame data D1_1 in the first SPR format SPR1 to generate the output frame data D2_1, taken as the first frame data, in the first SPR format SPR1. The output frame data D2_1 in the first SPR format SPR1 is configured to drive the display panel 420, which has a first SPR arrangement format SPR1.

The processor circuit 414 includes a second circuit block 144 to perform a scaling operation on the input frame data D1_1 in the first SPR format SPR1 to obtain the output frame data D2_1 in the first SPR format SPR1 according to the selected image processing parameters. The selected image processing parameters include scaling parameters. The input frame data D1_1 in the first SPR format SPR1 is corresponding to a first image size, and the output frame data D2_1 in the first SPR format SPR1 is corresponding to a second image size. The second image size is different from the first image size. In the present embodiment, the processor circuit 414 does not perform the inverse SPR format conversion on the input frame data D1_1 before the scaling operation.

The scaling parameters includes weight values determined according to distances between locations of a plurality of neighboring input pixel data of the input frame data D1_1 and a location of an output pixel data of the output frame data D2_1.

To be specific, taking input data $I_{i,j}$ and output data $O_{i,j}$ shown in FIG. 5 for example, a distance and weight model is define as FIG. 6 for the input data $I_{i,j}$ and the output data $O_{i,j}$. The distance and weight model allows for the calculation of a set of weights for a specified subpixel and its neighboring subpixels. The set of weights can then be used to determine the output data $O_{i,j}$ in weighted formulas. For example, the output data $O_{1,1}$ is calculated in the following weighted formula:

$$O_{1,1} = c'_0 \cdot I_{0,0} + c'_1 \cdot I_{1,1} + c'_2 \cdot I_{2,0} + c'_3 \cdot I_{0,2}$$

$$c'_0 + c'_1 + c'_2 + c'_3 = 1$$

where $c'_0$~$c'_3$ are weight values, and $I_{0,0}$, $I_{1,1}$, $I_{2,0}$, $I_{0,2}$ are input data of the neighboring subpixels. Other output data can be calculated in the similar manner. Generally speaking, the closer the output data $O_{i,j}$ is to the input data $I_{i,j}$, the larger the weight values. The number of neighboring subpixels for the weight calculation is not limited to 4, and can be increased freely and given appropriate weight values by adjusting the distance and weight model.

Figure 7:
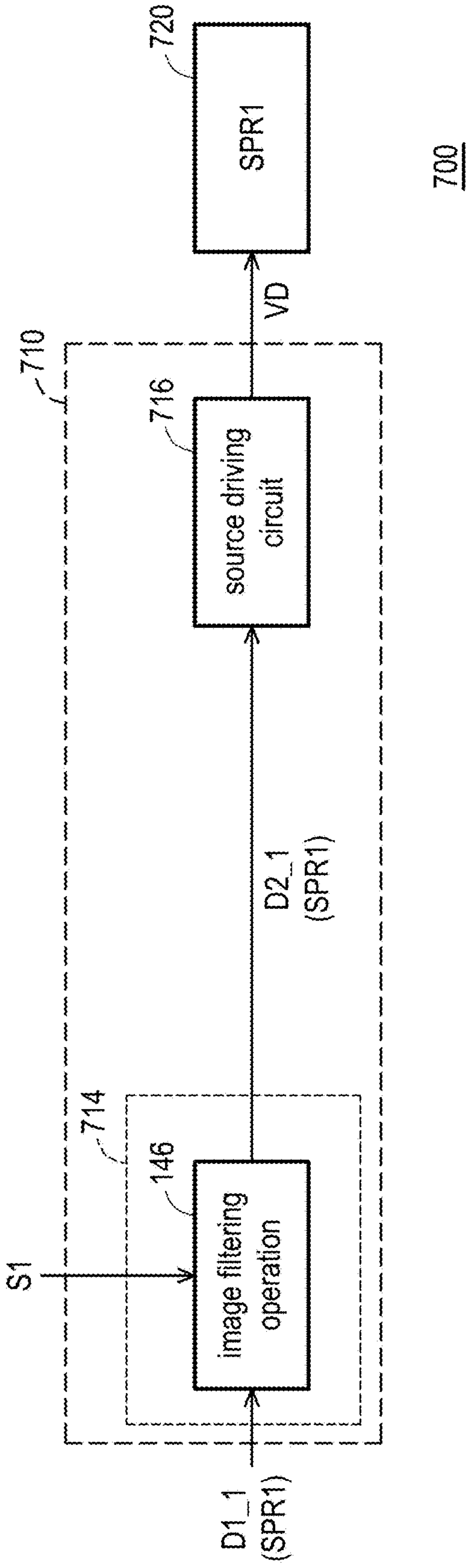
FIG. 7 is a block diagram illustrating a display device according to another embodiment of the invention.
Figure 8:
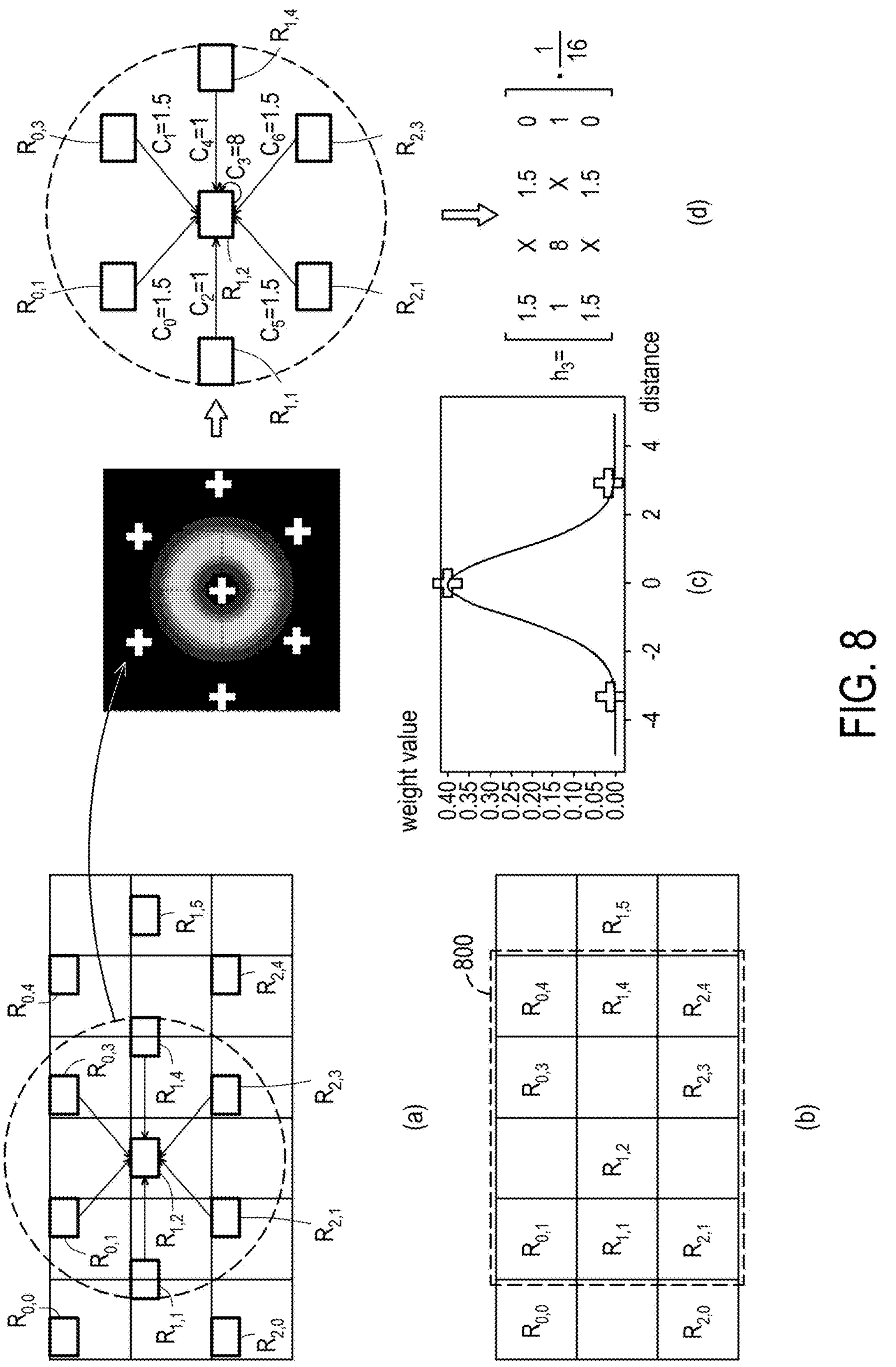
FIG. 8 and FIG. 9 are schematic diagrams illustrating an image filtering operation according to an embodiment of the invention.
Figure 9:
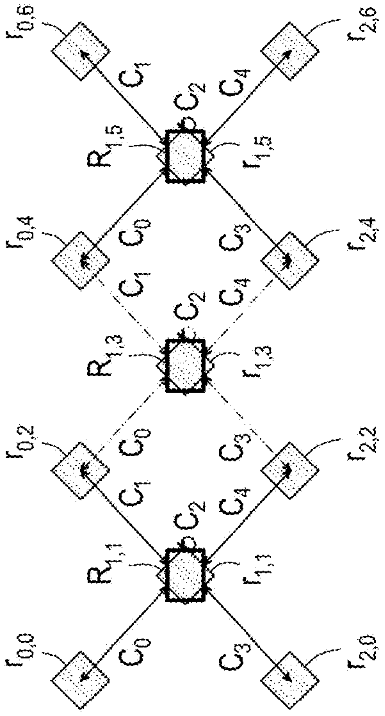

FIG. 7 is a block diagram illustrating a display device according to another embodiment of the invention. FIG. 8 and FIG. 9 are schematic diagrams illustrating an image filtering operation according to an embodiment of the invention. Referring to FIG. 7 to FIG. 9, because the delta-arrangement data format ((b) of FIG. 8) is slightly different from the actual layout ((a) of FIG. 8) of subpixels on the display panel, after sampling the coefficients from the actual layout, it is necessary to arrange the coefficients to match the data format.

The processor circuit 714 processes the input frame data D1_1 in the first SPR format SPR1 to generate the output frame data D2_1, taken as the first frame data, in the first SPR format SPR1. The output frame data D2_1 in the first SPR format SPR1 is configured to drive the display panel 720, which has the first SPR arrangement SPR1.

The processor circuit 714 includes a third circuit block 146 to performs an image filtering operation on the input frame data D1_1 in the first SPR format SPR1 to obtain the output frame data D2_1 in the first SPR format SPR1 according to the selected image processing parameters. The selected image processing parameters include filtering parameters. In the present embodiment, the processor circuit 714 does not perform the inverse SPR format conversion on the input frame data D1_1 before the image filtering operation.

Image filtering is the convolution of an image using a specified matrix to achieve blurring, sharpening, or feature detection of an image. Some common types of image filtering are as follows: low pass filter, high pass filter, sharpness, edge detector, and edge smooth.

Taking the low pass filter for example, a distance and weight model is define as (c) of FIG. 8 for the output data $R_{i,j}$, and (d) of FIG. 8 shows the weight matrix h3 for the low pass filter. The weight matrix h3 includes weight values determined according to distances between locations of a plurality of neighboring output pixel data $R_{0,1}$, $R_{0,3}$, $R_{0,4}$, $R_{1,1}$, $R_{1,4}$, $R_{2,1}$, $R_{2,3}$ $R_{2,4}$, and a location of an output pixel data $R_{1,2}$ of the output frame data D2_1, as illustrated in dotted block 800 of (b) of FIG. 8.

The weight matrix h3 obtained in the above method can be used for the low pass filter of the input frame data D1_1. For example, the red output data $R_{1,1}$, $R_{1,3}$, $R_{1,5}$, are calculated in the following weighted formulas:

$$R_{1,1} = c_0 \cdot r_{0,0} + c_1 \cdot r_{0,2} + c_2 \cdot r_{1,1} + c_3 \cdot r_{2,0} + c_4 \cdot r_{2,2}$$

$$R_{1,3} = c_0 \cdot r_{0,2} + c_1 \cdot r_{0,4} + c_2 \cdot r_{1,3} + c_3 \cdot r_{2,2} + c_4 \cdot r_{2,4}$$

$$R_{1,5} = c_0 \cdot r_{0,4} + c_1 \cdot r_{0,6} + c_2 \cdot r_{1,5} + c_3 \cdot r_{2,4} + c_4 \cdot r_{2,6}$$

where $c_0$~$c_4$ are weight values, and $r_{0,0}$~$r_{2,6}$ are input data of the neighboring subpixels. Other output data can be calculated in the similar manner. The weight matrixes of other image filters, e.g. the high pass filter and/or the sharpness, can be obtained in the similar method.

Figure 10:
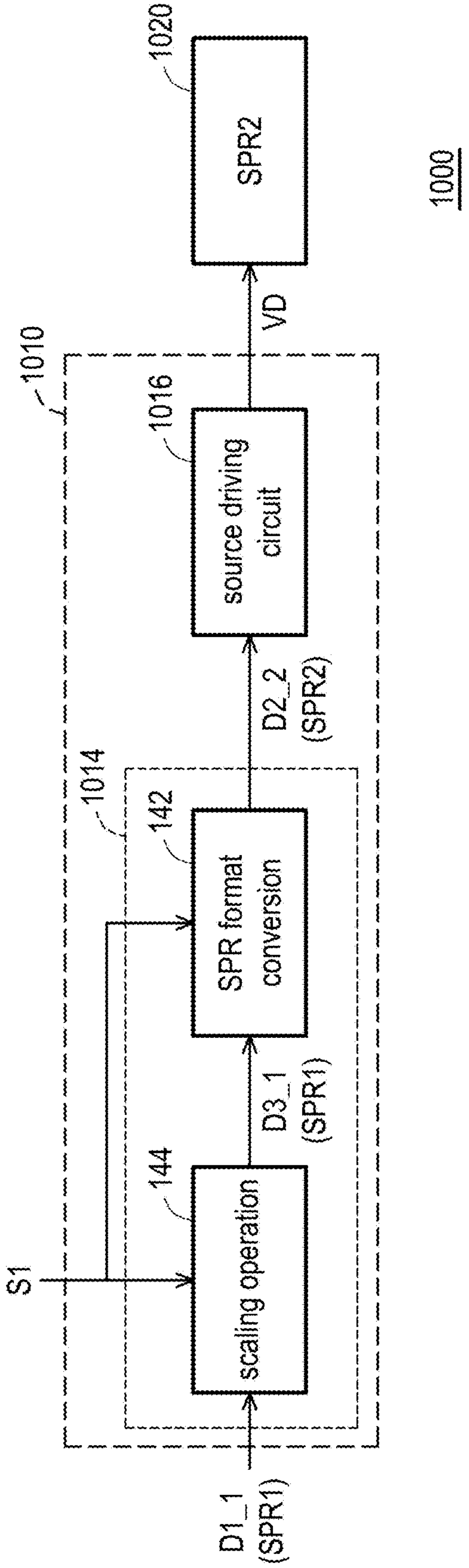
FIG. 10 is a block diagram illustrating a display device according to another embodiment of the invention.

FIG. 10 is a block diagram illustrating a display device according to another embodiment of the invention. Referring to FIG. 4 and FIG. 10, the display device 1000 of the present embodiment is similar to the display device 400 of FIG. 4, and the main difference therebetween, for example, lies in that the processor circuit 1014 is further configured to perform the SPR format conversion on the output frame data D3_1 in the first SPR format SPR1 to generate the first frame data D2_2 in the second SPR format SPR2 which is the subpixel arrangement format of the display panel 1020. To be specific, the processor circuit 1014 further includes the first circuit block 142 to performs the SPR format conversion on the output frame data D3_1, and thus the output frame data D3_1 is converted to the first frame data D2_2.

Figure 11:
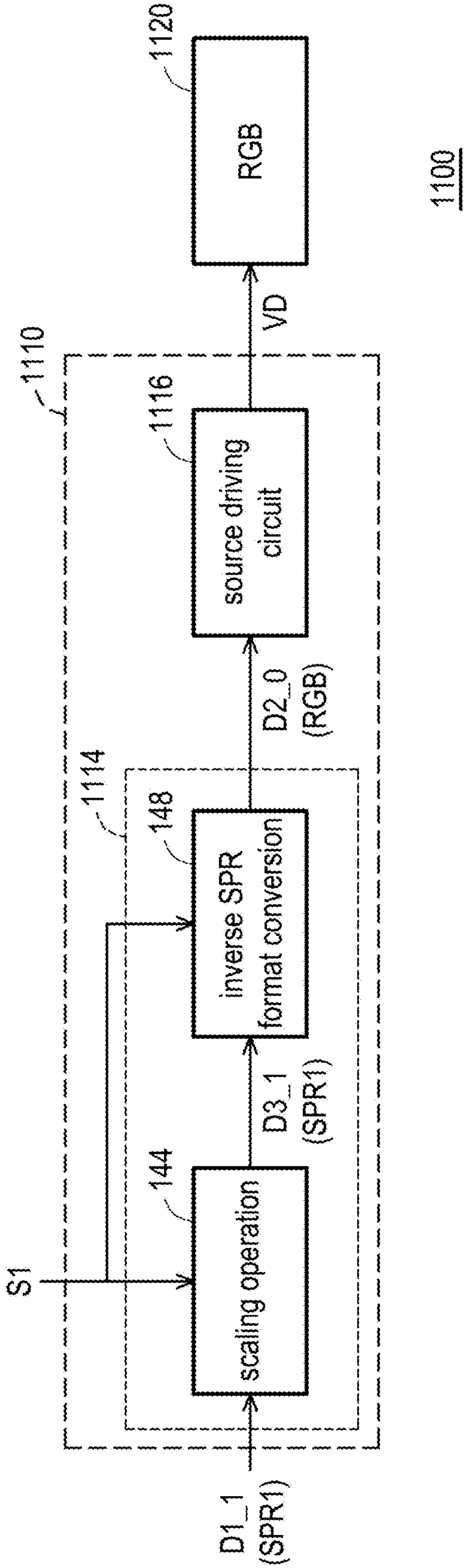
FIG. 11 is a block diagram illustrating a display device according to another embodiment of the invention.

FIG. 11 is a block diagram illustrating a display device according to another embodiment of the invention. Referring to FIG. 4 and FIG. 11, the display device 1100 of the present embodiment is similar to the display device 400 of FIG. 4, and the main difference therebetween, for example, lies in that the processor circuit 1114 is further configured to perform the inverse SPR format conversion on the output frame data D3_1 in the first SPR format SPR1 to generate the first frame data D2_0 in a true color format RGB which is the subpixel arrangement format of the display panel 1120. To be specific, the processor circuit 1114 further includes the fourth circuit block 148 to performs the inverse SPR format conversion on the output frame data D3_1, and thus the output frame data D3_1 is converted to the first frame data D2_0.

Figure 12:
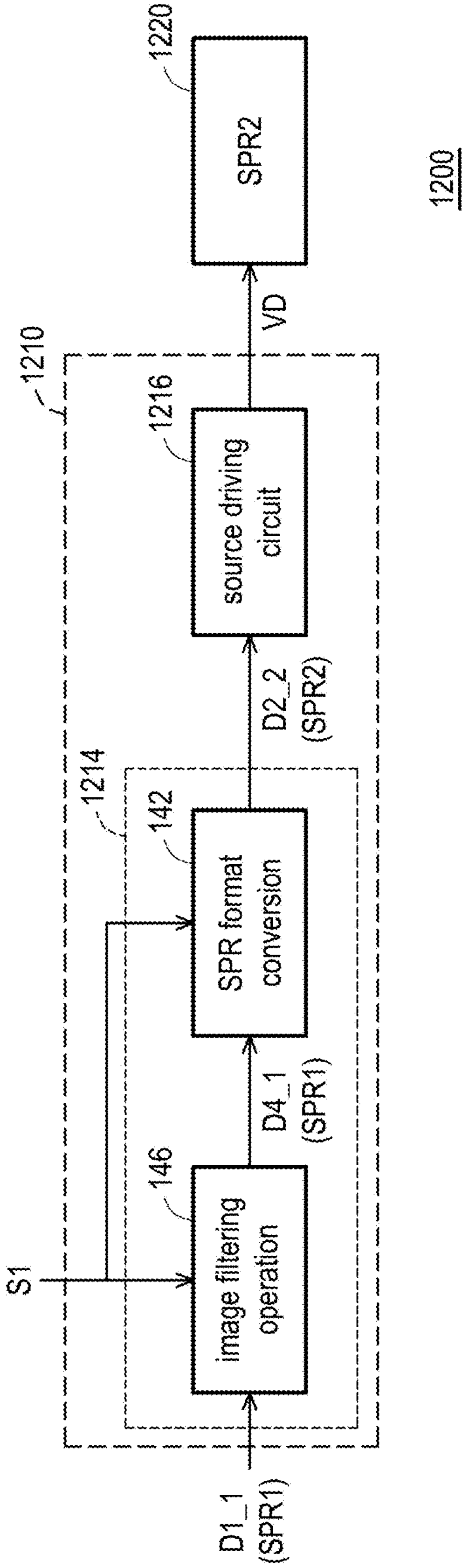
FIG. 12 is a block diagram illustrating a display device according to another embodiment of the invention.

FIG. 12 is a block diagram illustrating a display device according to another embodiment of the invention. Referring to FIG. 7 and FIG. 12, the display device 1200 of the present embodiment is similar to the display device 700 of FIG. 7, and the main difference therebetween, for example, lies in that the processor circuit 1214 is further configured to perform the SPR format conversion on the output frame data D4_1 in the first SPR format SPR1 to generate the first frame data D2_2 in the second SPR format SPR2 which is the subpixel arrangement format of the display panel 1220. To be specific, the processor circuit 1214 further includes the first circuit block 142 to performs the SPR format conversion on the output frame data D4_1, and thus the output frame data D4_1 is converted to the first frame data D2_2.

Figure 13:
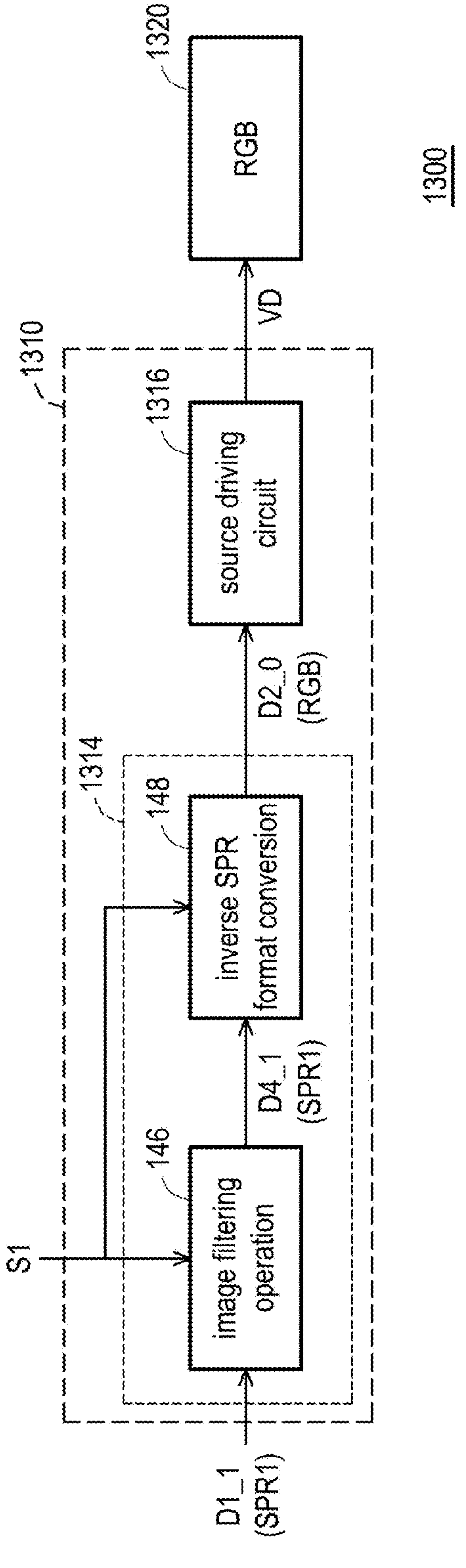
FIG. 13 is a block diagram illustrating a display device according to another embodiment of the invention.

FIG. 13 is a block diagram illustrating a display device according to another embodiment of the invention. Referring to FIG. 7 and FIG. 13, the display device 1300 of the present embodiment is similar to the display device 700 of FIG. 7, and the main difference therebetween, for example, lies in that the processor circuit 1314 is further configured to perform the inverse SPR format conversion on the output frame data D4_1 in the first SPR format SPR1 to generate the first frame data D2_0 in the true color format RGB which is the subpixel arrangement format of the display panel 1320. To be specific, the processor circuit 1314 further includes the fourth circuit block 148 to performs the inverse SPR format conversion on the output frame data D4_1, and thus the output frame data D4_1 is converted to the first frame data D2_0.

Figure 14:
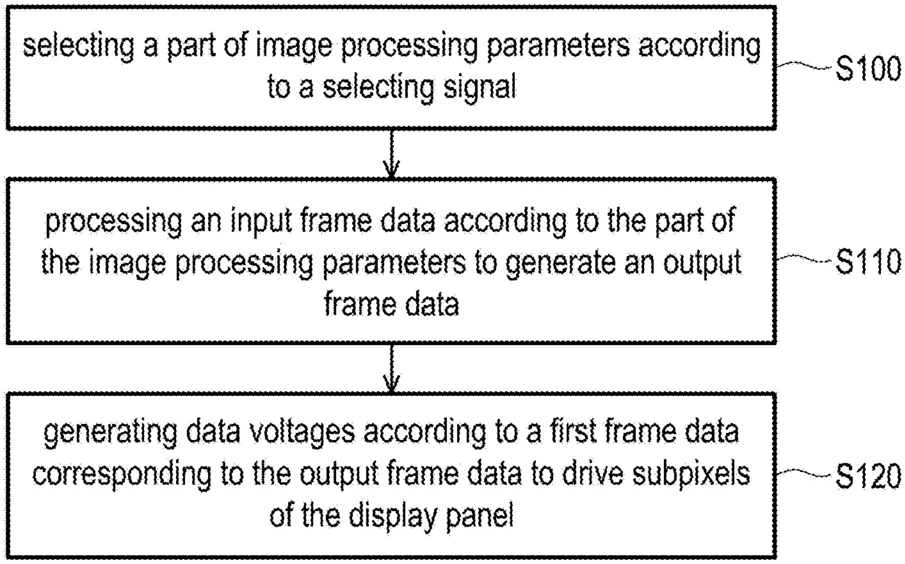
FIG. 14 is a flowchart illustrating steps in a method for driving a display panel according to an embodiment of the invention.

FIG. 14 is a flowchart illustrating steps in a method for driving a display panel according to an embodiment of the invention. Referring to FIG. 1 and FIG. 14, in the present embodiment, the method for sensing the display panel is at least adapted to the display device 100 depicted in FIG. 1, but the invention is not limited thereto.

Taking the display device 100 for example, in step S100, the processor circuit 114 selecting a part of image processing parameters from the storage circuit 112 according to the selecting signal S1. The selecting signal S1 indicates the first SPR format that the input frame data D1 is in. In step S110, the processor circuit 114 processes the input frame data D1 according to the part of the image processing parameters to generate an output frame data D2, wherein the output frame data D2 is in a subpixel arrangement format. In step S120, the source driving circuit 116 generating data voltages VD according to the output frame data D2 to drive subpixels of the display panel 120, wherein the subpixels of the display panel 120 are arranged in the same subpixel arrangement format. Therefore, the processor circuit 114 does not performing an inverse SPR format conversion on the input frame data D1 before processing the input frame data D1 according to the selected image processing parameters.

The method for driving the display panel described in the embodiment of the invention is sufficiently taught, suggested, and embodied in the embodiments illustrated in FIG. 1 to FIG. 13, and therefore no further description is provided herein.

In summary, in the embodiments of the invention, it is possible to process the SPR images directly without converting to the true color images. The image processing is performed in SPR domain with reference to the location of the subpixels for conversion and operation. As a result, the distortion that may occur during the format conversion can be prevented, and meaningless operations are avoided. In addition, the transmission of SPR data can reduce the bandwidth of the transmission interface, such as the mobile industry processor interface (MIPI), and thus reduce the power consumption of the display device. Furthermore, an application processor can transmit low-resolution images, which can then be restored by the driver device, to further reduce the power consumption.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A driver device, configured to drive a display panel to display images, the driver device comprising:

- a storage circuit, configured to store image processing parameters;
- a processor circuit, coupled to the storage circuit and a host device, wherein the processor circuit is configured to receive an input frame data and a selecting signal, wherein the host device located outside the driver device is configured to output data having a first subpixel rendering (SPR) format as the input frame data to the processor circuit located inside the driver device, and the selecting signal serves to indicate the input frame data received by the processor circuit has the first SPR format; and the processor circuit is further configured to process the input frame data according to a part of the image processing parameters which is selected according to the selecting signal, to generate the output frame data; and
- a source driving circuit, coupled to the processor circuit, and configured to receive a first frame data in a subpixel arrangement format from the processor circuit; and generate data voltages according to the first frame data to drive subpixels of the display panel, wherein the subpixels of the display panel are arranged in the subpixel arrangement format.

2. The driver device of claim 1, wherein the processor circuit does not perform an inverse SPR format conversion on the input frame data before processing the input frame data according to the selected image processing parameters.

3. The driver device of claim 1, wherein the processor circuit processes the input frame data in the first SPR format according to the selected image processing parameters adapted for a SPR format conversion to generate the output frame data, taken as the first frame data, in a second SPR format different from the first SPR format.

4. The driver device of claim 3, wherein the selected image processing parameters adapted for the SPR format conversion are configured to generate a plurality of output pixel data of the output frame data, wherein the plurality of output pixel data is corresponding to a repeating pixel arrangement unit, and the repeating pixel arrangement unit comprises m by n pixels of the display panel, wherein m and n are positive integers.

5. The driver device of claim 1, wherein the processor circuit is further configured to perform an inverse SPR format conversion on the output frame data in the first SPR format to generate the first frame data in a true color format which is the subpixel arrangement format of the display panel.

6. The driver device of claim 1, wherein the processor circuit is further configured to perform a SPR format conversion on the output frame data in the first SPR format to generate the first frame data in a second SPR format which is the subpixel arrangement format of the display panel.

7. The driver device of claim 1, wherein the selected image processing parameters comprise scaling parameters, and the processor circuit performs a scaling operation on the input frame data in the first SPR format to obtain the output frame data in the first SPR format according to the scaling parameters, wherein the input frame data in the first SPR format is corresponding to a first image size, and the output frame data in the first SPR format is corresponding to a second image size different from the first image size.

8. The driver device of claim 7, wherein the scaling parameters comprise weight values determined according to distances between locations of a plurality of neighboring input pixel data of the input frame data and a location of an output pixel data of the output frame data.

9. The driver device of claim 7, wherein the processor circuit is further configured to perform a SPR format conversion on the output frame data in the first SPR format to generate the first frame data in a second SPR format which is the subpixel arrangement format of the display panel.

10. The driver device of claim 1, wherein the selected image processing parameters comprise filtering parameters, and the processor circuit performs an image filtering operation on the input frame data in the first SPR format to obtain the output frame data in the first SPR format according to the filtering parameters.

11. The driver device of claim 10, wherein the processor circuit is further configured to perform a SPR format conversion on the output frame data in the first SPR format to generate the first frame data in a second SPR format which is the subpixel arrangement format of the display panel.

12. A method for driving a display panel, the method comprising:

using a processor circuit to receive an input frame data and a selecting signal, wherein a host device located outside a driver device outputs data having a first subpixel rendering (SPR) format as the input frame data to the processor circuit located inside the driver device;

using the processor circuit to select a part of image processing parameters according to the selecting signal, wherein the selecting signal indicates the input frame data received by the processor circuit has the first SPR format;

using the processor circuit to process the input frame data according to the part of the image processing parameters to generate an output frame data, wherein the output frame data is in a subpixel arrangement format; and generating data voltages according to a first frame data corresponding to the output frame data to drive subpixels of the display panel, wherein the subpixels of the display panel are arranged in the subpixel arrangement format.

13. The method for driving the display panel of claim 12, further comprising:

not performing an inverse SPR format conversion on the input frame data before processing the input frame data according to the selected image processing parameters.

14. The method for driving the display panel of claim 12, using the processor circuit to process the input frame data according to the part of the image processing parameters to generate the output frame data comprising:

processing the input frame data in the first SPR format according to the selected image processing parameters adapted for a SPR format conversion to generate the output frame data, taken as the first frame data, in a second SPR format different from the first SPR format.

15. The method for driving the display panel of claim 14, wherein the selected image processing parameters adapted for the SPR format conversion are configured to generate a plurality of output pixel data of the output frame data, wherein the plurality of output pixel data is corresponding to a repeating pixel arrangement unit, and the repeating pixel arrangement unit comprises m by n pixels of the display panel, wherein m and n are positive integers.

16. The method for driving the display panel of claim 12, further comprising:

performing an inverse SPR format conversion on the output frame data in the first SPR format to generate the first frame data in a true color format which is the subpixel arrangement format of the display panel.

17. The method for driving the display panel of claim 12, further comprising:

performing a SPR format conversion on the output frame data in the first SPR format to generate the first frame data in a second SPR format which is the subpixel arrangement format of the display panel.

18. The method for driving the display panel of claim 12, wherein the selected image processing parameters comprise scaling parameters, and using the processor circuit to process the input frame data according to the part of the image processing parameters to generate the output frame data comprising:

performing a scaling operation on the input frame data in the first SPR format to obtain the output frame data in the first SPR format according to the scaling parameters, wherein the input frame data in the first SPR format is corresponding to a first image size, and the output frame data in the first SPR format is corresponding to a second image size different from the first image size.

19. The method for driving the display panel of claim 18, wherein the scaling parameters comprise weight values determined according to distances between locations of a plurality of neighboring input pixel data of the input frame data and a location of an output pixel data of the output frame data.

20. The method for driving the display panel of claim 18, further comprising:

performing a SPR format conversion on the output frame data in the first SPR format to generate the first frame data in a second SPR format which is the subpixel arrangement format of the display panel.

21. The method for driving the display panel of claim 12, wherein the selected image processing parameters comprise filtering parameters, and using the processor circuit to process the input frame data according to the part of the image processing parameters to generate the output frame data comprising:

performing an image filtering operation on the input frame data in the first SPR format to obtain the output frame data in the first SPR format according to the filtering parameters.

22. The method for driving the display panel of claim 21, further comprising:

performing a SPR format conversion on the output frame data in the first SPR format to generate the first frame data in a second SPR format which is the subpixel arrangement format of the display panel.

* * * * *